United States Patent [19]

Betts

[11] Patent Number: 5,261,450

[45] Date of Patent: Nov. 16, 1993

[54] PRESSURE RELIEF VENT WITH SURGE SUPPRESSION

[75] Inventor: Charles A. Betts, Warren, Pa.

[73] Assignee: Betts Industries, Inc., Warren, Pa.

[21] Appl. No.: 977,144

[22] Filed: Nov. 16, 1992

[51] Int. Cl.$^5$ ............................................. F16K 21/10
[52] U.S. Cl. ................................. 137/514.7; 137/536; 137/543
[58] Field of Search ................... 137/514.7, 536, 543

[56] References Cited

U.S. PATENT DOCUMENTS

| | | | |
|---|---|---|---|
| 949,208 | 2/1910 | Ballard | 137/514.7 |
| 1,868,504 | 7/1932 | Kuhl | 137/514.7 X |
| 2,373,046 | 4/1945 | Osborn, Jr. | 137/514.7 X |
| 3,131,718 | 5/1964 | Mingrone | 137/543 X |
| 3,586,033 | 6/1971 | Hieber | 137/514.7 X |
| 4,270,569 | 6/1981 | Reay et al. | 137/514.7 |
| 4,813,452 | 3/1989 | Smith | 137/514.7 X |
| 4,867,603 | 9/1989 | Chang | 137/514.7 X |

OTHER PUBLICATIONS

49 CFR & 178.345-10 (b)(ii).
TTMA Recommended Practice RP-81-90, Jun. 29, 1990.

Primary Examiner—John Rivell
Attorney, Agent, or Firm—Oldham, Oldham & Wilson Co.

[57] ABSTRACT

A device relieves a positive pressure difference between the inside of a vessel and the outside of the vessel through an opening in the vessel. The device has a base portion, a cap portion and a biasing means. The base portion has a means for mounting the device in the opening; a cap seat providing an orifice through which the pressure difference may be relieved; and a generally hollow body portion attached to the cap seat and extending concentrically with the cap seat into the vessel. The cap portion has a cap having an external surface with a diameter larger than the diameter of the cap seat to retain the cap external to the cap seat in sealing relationship; a rod mounted concentrically and normal to the internal surface at one end, the other end extending into the body portion and terminating in a piston with a shoulder, the piston being in concentric sliding engagement within the body portion. The biasing means has a compression spring acting between the interior of the body portion and the piston shoulder to urge the cap into sealing relationship with the cap seat; and a damping means with the piston effectively dividing the body portion into first and second chambers, a channel communicating one chamber to the other and a fluid in the chambers so movement of the piston in either direction requires a portion of the fluid to pass through the channel from one chamber to the other.

16 Claims, 2 Drawing Sheets

PRESSURE RELIEF VENT WITH SURGE SUPPRESSION

The present invention relates to a vent assembly for relieving a positive pressure difference between the inside and the outside of a vessel only when the pressure difference is the result of a slow and steady rise in the vessel pressure. The vent assembly should not relieve pressure differences that result from rapid increase of vessel internal pressure that are of short duration.

BACKGROUND ART

It is common practice in the chemicals handling industries to provide tanks and other vessels with pressure relief vents. One such pressure relief system or vent is the rupture disk. A rupture disk is a relatively thin disk of material with a series of score lines, usually radially positioned, on the generally flat surface thereof. The disk remains intact as long as the pressure differential between the tank interior and the tank exterior remains below a certain amount known as the set pressure. When the pressure differential exceeds the set pressure, the reduced ability of the score lines to withstand the pressure results in the disk rupturing, allowing the pressure differential to be released. Once ruptured, however, the disk does not reclose and must be replaced. This is not an acceptable solution in a situation where the tank or vessel is mobile and may be overturned in an accident or the like, since the irreversible opening of the disk may result in release of a hazardous material such as gasoline.

A second type of relief vent is the re-seatable type of pressure relief vent. Such relief vents have a flat disk seated in an opening in the tank. A spring or other biasing means is used to hold the disk against the seat in a sealing relationship as long as the pressure differential remains below the set pressure. When the pressure differential exceeds the set pressure, the biasing force of the spring or other biasing means is overcome and the disk lifts long enough to relieve the pressure differential below the set pressure, at which time the disk re-seats. When a cargo tank or the like is involved in a motor vehicle or train accident, the tank will often experience a brief surge of transient pressure greatly in excess of the set pressure. If this occurs and the tank or vessel is overturned so that the vent is located below the liquid level in the vessel, the opening of the vent by the pressure surge may result in product spillage.

New U.S. Department of Transportation regulations scheduled to go into effect in August, 1995 will require that the venting system on tanks or vessels be able to withstand a dynamic pressure surge reaching 30 psig above the set pressure and sustained for at least 60 milliseconds without allowing any leakage through the vent (The current regulation, effective in August, 1992, allows leakage under identical circumstances of up to one gallon of liquid). However, the venting system must open at the set pressure when it is exposed to a steady pressure rise in the tank.

SUMMARY OF THE INVENTION

It is therefore a first object of the present invention to provide a pressure relief vent for a tank or vessel to relieve a positive pressure difference between the interior and the exterior of the tank or vessel through an opening therein in such a manner that a steady rise in tank pressure above a set pressure will be relieved, but a transient, dynamic surge of pressure above the set pressure, such as might occur in a collision, an impact or the like, will not cause the relief vent to open and allow the leakage of product.

This and other objects of the invention are achieved by a device comprising a base portion, a cap portion and a means for biasing. The base portion has a cap seat at its first end which provides an orifice through which the positive pressure difference may be relieved with a generally hollow body portion attached to the cap seat. The body portion extends into the vessel concentrically with the cap seat. The base portion also has a means for mounting the device into the opening in the vessel. The cap portion has a cap with a first surface external to the vessel and an opposing second surface. The first surface has a diameter larger than the diameter of the cap seat to retain the cap external to the cap seat in sealing relationship. The cap portion also has a rod mounted concentrically and normal to the second surface of the cap at a first end thereof, the second end thereof extending into the body portion and terminating in a piston having a shoulder thereon. The piston is in concentric sliding engagement within the body portion. The means for biasing is mounted in the body portion and has a compression spring coacting between an interior surface of the body portion and the shoulder of the piston to urge the cap into sealing relationship with the cap seat and a damping means acting within the body portion to resist movement of the cap portion relative to the base portion in either direction.

In one embodiment of the invention the damping means is the piston in said body portion effectively dividing said body portion into a first and a second chamber, a channel communicating the first chamber to the second chamber, and a fluid contained in the chambers such that movement of the piston in either direction requires a portion of the fluid to pass through the channel from one chamber to the other. In one version of this embodiment, the channel is a bore through the piston. In another version of this embodiment, the channel is an annular gap between the piston and the body portion. In the preferred embodiment, the fluid is an essentially non-compressible liquid.

In a further embodiment, the cap further has a flange around the periphery of the second surface thereof. This flange is sized to be in concentric sliding engagement with an internal diameter of the cap seat.

BRIEF DESCRIPTION OF THE DRAWINGS

Other objects and advantages of the present invention will be apparent from the following description taken in conjunction with the accompanying drawings, wherein identical parts are referred to with identical part numbers and wherein.

DETAILED DESCRIPTION OF THE DRAWINGS

Figure 1:
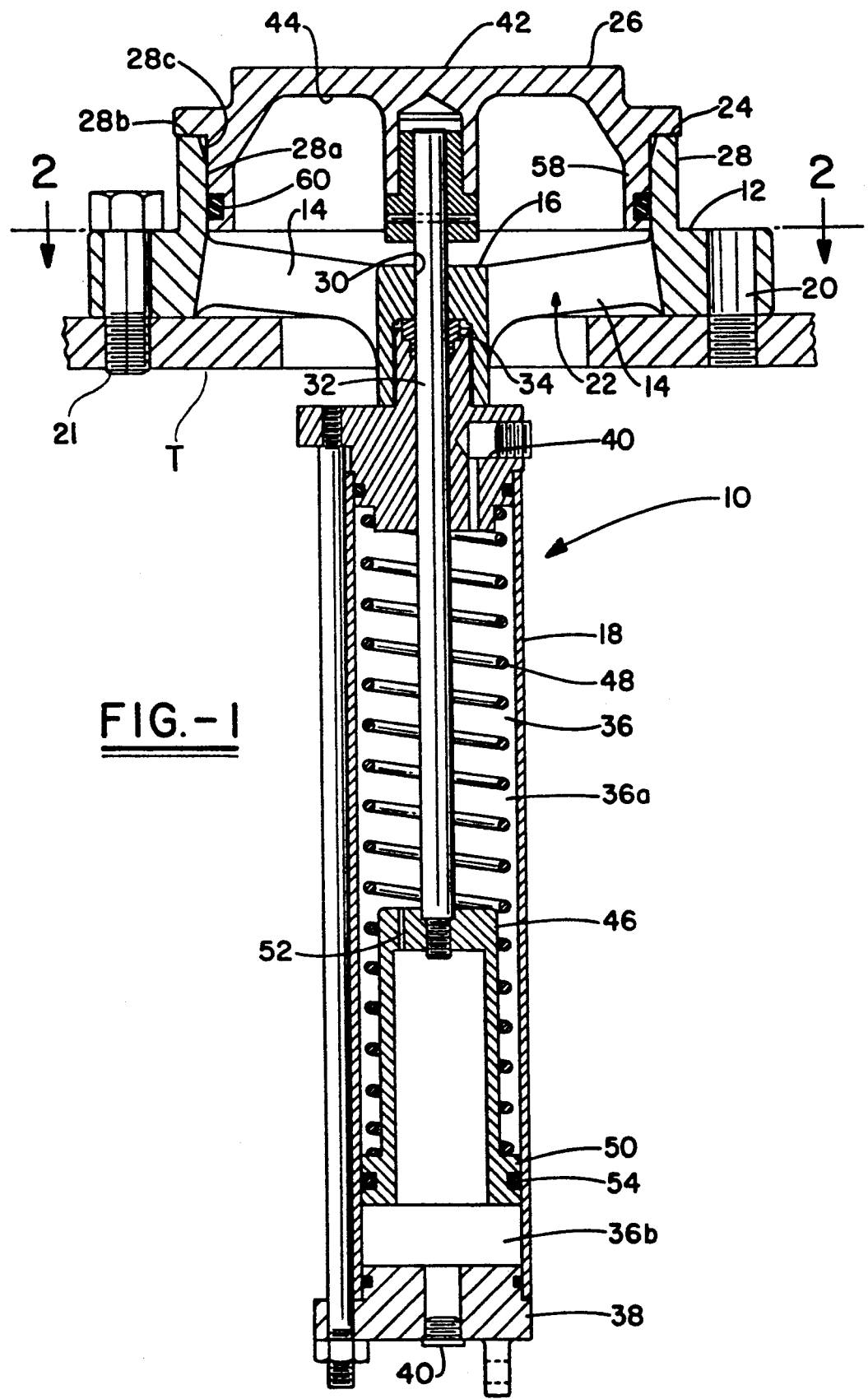
FIG. 1 shows a cross-sectional elevation view of the relief vent of the present invention.
Figure 2:
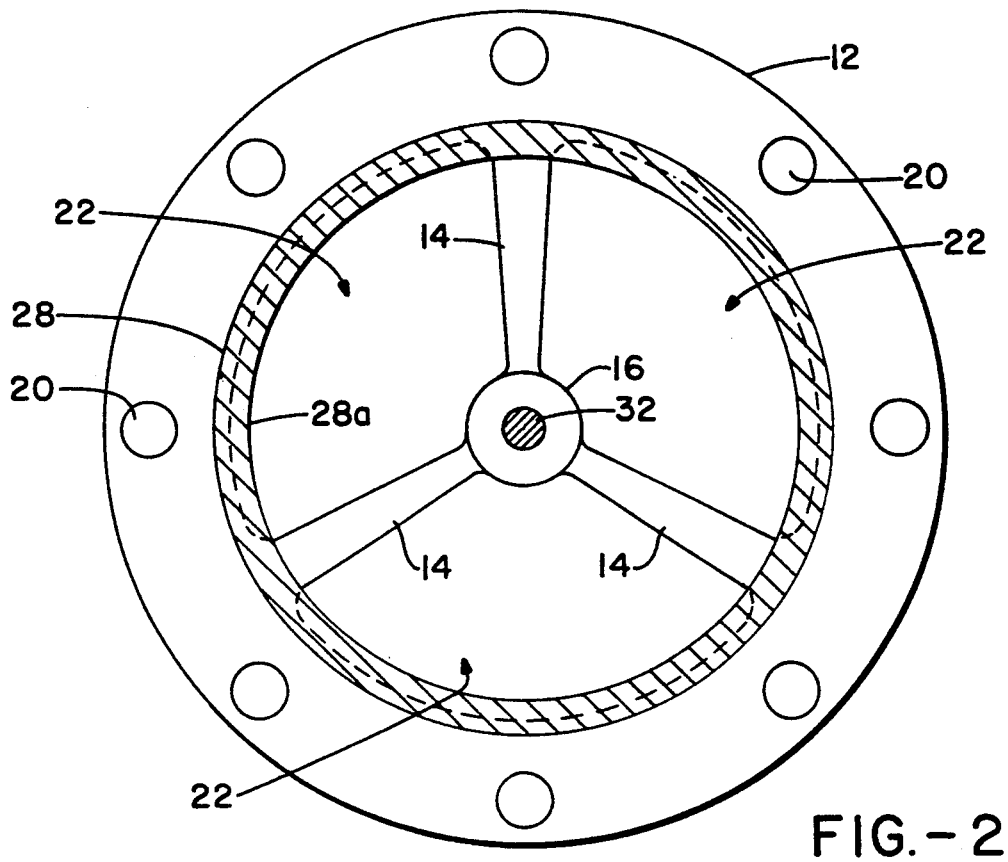
FIG. 2 shows a section taken across the present invention as shown by Line 2—2 in FIG. 1.

The pressure relief vent 10 of the present invention is shown in FIGS. 1 and 2. The relief vent 10 includes a base portion in the form of an annular ring 12 having inwardly extending radial webs 14 which support at their juncture 16 a centrally disposed, upstanding body portion 18 between the webs. The annular ring 12 has mounting means disposed around the circumference thereof so that the annular ring may be mounted in an opening in a tank T. A typical mounting means would be a plurality of drilled or bored holes 20 through which standard fasteners, such as bolts 21, may be placed. In other tanks, the preferred method of mounting would be to place female threading on the tank opening and male threading on the annular ring so that the relief vent 10 can be attached to the tank through the sealing relationship provided by the threading. Even further mounting means would be known to those of ordinary skill in this art and the selection of such mounting means is not viewed as being particularly relevant to the inventive concept presented herein, as long as the device is securely mounted in a sealing relationship in the opening in the tank. Although not illustrated specifically in the FIGURES, it would also be a common practice to place a sealing gasket between the tank wall and the annular ring 12 so that the gasket can coact with the mounting means to provide a sealing relationship between the relief vent 10 and the tank.

The inwardly extending radial webs 14 attached to the annular ring 12 and the inner surface of the annular ring itself define openings 22 through which a positive pressure difference between the tank interior and the tank exterior may be relieved. The annular ring 12 further provides a cap seat 24 upon which the cap 26 of the cap portion of the relief vent 10 may be urged into a sealing relationship. In the preferred embodiment, the cap seat 24 comprises an upstanding annular flange 28 disposed around the inside of the annular ring 12, in which case the inner surface 28a of the flange 28 and the top surface 28b of the flange comprise the seating surfaces. In an especially preferred embodiment, the inner top surface 28c of the flange 28 is chamfered. This allows the cap 26 to be more easily reseated when the cap portion lifts to allow venting of a pressure increase.

At their point of juncture 16, the radial webs 14 are attached to a generally hollow body portion 18, which extends into the tank or vessel so that it is concentric with the cap seat 24. The preferred body portion 18 is a hollow cylinder, with an opening 30 at the first end of the body portion, through which the rod 32 of the cap portion may be slidingly engaged. It would be customary to provide this opening 30 with an appropriate packing gland 34 so that fluid contained within the cylinder cavity 36 would not be lost through movement of the rod 32. The second end of the body portion 18 would be closed by a plug 38, thereby providing accessibility to the cylinder cavity 36 for assembly and maintenance purposes, but usually keeping the cylinder cavity 36 closed. It would also be common practice to provide each end of the body portion 18 with a port 40 through which the fluid may be injected into the cylinder cavity 36.

The second major component of the relief vent 10 of the present invention is the cap portion, which is movably positioned in the base portion so that motion of the cap portion relative to the base portion provides the selective opening and closing of the relief vent 10 that is necessary to selectively relieve a positive pressure differential existing between the interior and the exterior of the tank in which the relief vent 10 is mounted. The cap portion comprises generally a cap 26 and a rod 32.

The cap 26 has a first surface 42 that is external to the vessel and an opposing second surface 44. The cap 26 has a diameter somewhat larger than the diameter of the cap seat 24 so that the cap 26 is retained external to the cap seat 24 in sealing relationship. The rod 32 is mounted concentrically and normal to the second surface 44 of the cap at its first end. The second end of the rod 32 extends into the tank or vessel and passes through the opening 30 at the first end of the body portion. The second end of the rod 32 extends well into the cylinder cavity 36 and is attached to a piston 46 which is in sliding engagement with the inner surface of the body portion 18. When the cap 26 is seated on the cap seat 24, the piston 46 will be positioned near the second end of the body portion 18 and when the cap 26 lifts off of the cap seat 24 to release pressure, the piston 46 will move toward the first end of the body portion 18.

Movement of the disk portion relative to the base portion will be better understood by an understanding of the biasing means that is contained within the body portion. The biasing means has two main components: a compression spring 48 and a damping means. The compression spring 48 is preferably a helical spring, preferably metallic. The spring 48 is positioned within the cylinder cavity 36 so that the spring can coact between the interior surface of the body portion at the first end of the cylinder cavity and a shoulder 50 on the piston. When the cap 26 is seated on the cap seat 24 in sealing relationship, the compression spring 48 will be compressed at least slightly, so that there will be some force exerted by the spring in maintaining the sealing relationship. The compression spring 48 should be selected so that it has an external diameter that fits rather closely within the cylinder cavity 36 and an internal diameter large enough that the spring does not interfere with movement of the piston 46 along the length of the spring. As pressure increases within the tank, the pressure acts upon the second surface 44 of the cap 26 and the cap portion is urged outwardly from the cap seat 24. This outward urging or force is met by the resistance of the spring 48 to further compression. As the resistance of the spring 48 is overcome, the piston 46 and the attached cap 26 will be able to move outwardly. Once the increased pressure is relieved by the opening of the relief vent 10 at the cap seat 24, the spring 48 will cause the cap to re-seat. This mechanism is generally known in the prior art.

The addition of the damping means to the compression means is what takes the biasing means of the present invention beyond what has been known in the prior art. The damping means provides a resistance to movement of the cap portion relative to the base portion in either direction. The preferred damping means comprises the piston 46 in the cylinder cavity 36, which effectively divides the cylinder cavity 36 into first and second chambers 36a, 36b; a channel communicating the first chamber 36a to the second chamber 36b; and a fluid contained in the cylinder cavity 36 such that movement of the piston 46 in either direction requires passage of a portion of the fluid through the channel from one chamber to the other. In a first embodiment of this damping means, the channel between the first and second chambers 36a, 36b is a bore 52 through the piston 46, the cross-sectional area of the bore 52 being small relative to the cross-sectional area of the cylinder cavity 36. Even more particularly, the interior of the piston 46 may be hollowed out, since it is the cross-sectional area of the piston acting in the cylinder cavity 36 and not the mass of the piston that achieves the desired result.

Figure 3:
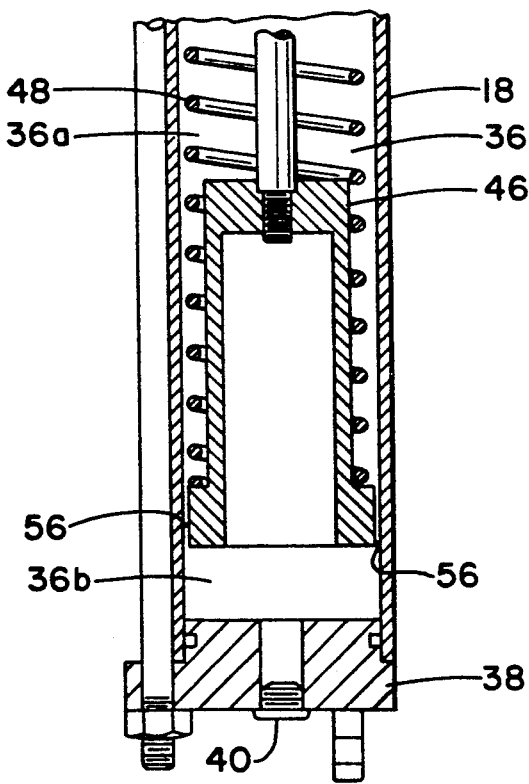
FIG. 3 shows a second embodiment of the present invention by showing an alternate lower portion of FIG. 1.

In a second embodiment of the damping means, illustrated in FIG. 3 by presenting the lower portion of FIG. 1 as altered to show the changes, the "O"-ring 54 that is shown as providing the sliding engagement of the piston 46 in the cylinder cavity 36 is omitted and a small annular gap 56 is provided between the piston 46 and the body portion 18. This annular gap 56 may act as the channel through which the fluid must pass from one chamber to the other to allow movement of the piston 46. "O"-ring 54 is preferably an elastomeric material and the selection of the particular material is well known to one of ordinary skill in this art.

In either embodiment, the bore 52 or annular gap 56 (or combination of both) comprising the channel will have a cross-sectional area that is small in comparison to the cross-sectional area of the cylinder cavity 36. The exact ratio of the respective areas will be dependent upon the viscous properties of the particular fluid selected, so that the cross-sectional area of the channel will increase as the viscosity of the fluid selected increases. In any case, the design of the piston 46 will mandate that the ratio of the cross-sectional area of the channel to the cross-sectional area of the cylinder cavity 36 will be such that the ratio will be less than 0.80 or so. At a ratio higher than 0.80, the piston 46 would cease to effectively function as a piston. With the most preferred viscous fluids, the operative ratio will be less than about 0.20.

The damping means thus provided is known in physics and has as a characteristic property that the resistance provided is directly proportional to the velocity of the piston 46. As the velocity of the piston 46 increases, the resistive force increases. Similarly, as the velocity of the piston 46 decreases, the resistive force decreases. When a brief surge of pressure acts on the relief vent 10, the force, acting on the second surface 44 of the cap 26 attempts to rapidly accelerate the cap towards the open position. The pressure force is counteracted by both the compressive resistance of the spring 48 and the damping force of the piston 46. If the force is of sufficient amplitude and duration, these resistances will be overcome and the pressure surge will be vented. If the surge pressure does not have sufficient amplitude and/or duration, the cap 26 will not unseat.

During a slow but steady pressure rise, as might be expected by an increasing temperature in the tank and the resultant vaporization of tank contents, the movement of the cap 26 and the piston 46 attached thereto through the rod 32 will be slow. In this instance, the resistance to movement will be provided almost entirely by the spring 48. As the cap portion continues to move due to the longer duration of the increased pressure, the cap 26 will unseat from the cap seat 24 and the pressure will be relieved. After the pressure is relieved, the damping means will act against the urging of the spring, rather than with it, so that the reseating process will be slow and smooth, and the cap 26 will not "slam" back into the closed or seated position.

A variety of fluids may be used in the damping means, but the preferred fluid is a liquid, since liquids, unlike gases, are essentially non-compressible. A preferred fluid should also have a viscosity, that is, a resistance to flow under shear, at the operating temperature of the device at least as high as that of water at room temperature, which is about 1 centipoise. A typical fluid that may be used in the damping means would be a petroleum-based mineral oil. Other typical fluids would vary from water to motor oils, with the freezing temperature of the fluid being one of the more important properties to consider, since the device will not function if the fluid freezes, although the viscosity may be allowed to vary substantially as long as the other parameters of the damping system are adjusted accordingly. A particularly preferred fluid is a hydraulic fluid commercially marketed by Kendall as under the tradename HYKEN GLACIAL BLU, which is a 5W-10W SAE grade oil. If the fluid is likely to be exposed to higher temperatures, thermal stability may become an important property.

A further desirable feature in the present invention is a cap 26 that maintains engagement with the cap seat 24 unless and until a certain minimum movement of the cap 26 occurs. An embodiment of this concept is presented in FIG. 1. The cap 26 has a flange 58 around its periphery on the lower or second surface 44 thereof, which is sized to be in concentric sliding engagement with an inner surface 28a of the cap seat 24. If the flange 58 is provided with an "O" ring 60 as shown, the sealing relationship between the cap 26 and the cap seat 24 will be maintained until the "O" ring 60 is displaced enough that the "O" ring reaches the top of the inner surface of the flange 28 on the cap seat 24, which is chamfered.

It will be recognized at this point that there are several variables involved in the design of the specific pressure relief valve to allow it to comply with the new Federal regulations requiring that it withstand a dynamic pressure surge reaching 30 psig above the set pressure and sustained for at least 60 milliseconds without allowing any leakage through the vent before the relief system reseals. Some of these variables include: the strength of the compression spring, the viscosity of the fluid filling the cylinder cavity, the ratio of the cross-sectional area of the channel to the cross-sectional area of the cylinder cavity, and the displacement of the cap portion within the cap seat before the cap portion is unseated, allowing venting.

While in accordance with the patent statutes, the best mode and preferred embodiment of the invention have been described, it is to be understood that the invention is not limited thereto, but rather is to be measured by the scope and spirit of the appended claims.

What is claimed is:

1. A device for relieving a positive pressure difference between the inside of a vessel and the outside of the vessel through an opening in said vessel, said device comprising:
   (a) a base portion comprising:
      (1) a means for mounting the device in the opening;
      (2) a cap seat providing an orifice through which the positive pressure difference may be relieved; and
      (3) a generally hollow body portion attached to said cap seat and extending into the vessel coaxially with the cap seat;
   (b) a cap portion comprising:
      (1) a cap having a first surface external to said vessel and an opposing second surface, said first surface having a diameter larger than the diameter of said cap seat to retain said cap external to said cap seat in sealing relationship, said cap further comprising a flange around the periphery of the second surface thereof, said flange sized to be in concentric sliding engagement with an internal diameter of said cap seat and an "O" ring is positioned in the flange to provide the sliding engagement and to prevent relief of pressure from within the vessel until the cap is lifted above its seated position sufficiently to break the sliding engagement;

(2) a rod mounted concentrically and normal to said second surface at a first end thereof, the second end thereof extending into said body portion and terminating in a piston having a shoulder thereon, said piston being coaxially mounted and longitudinally movable within said body portion; and (c) biasing means mounted in said body portion comprising:

(1) a compression spring coacting between an interior surface of said body portion and the shoulder of said piston to urge the cap into sealing relationship with said cap seat;

(2) a damping means acting within the body portion to resist movement of the cap portion relative to the base portion in either direction.

2. The device of claim 1 wherein the damping means comprises:

(a) said piston in said body portion effectively dividing said body portion into a first and a second chamber;

(b) a channel communicating said first chamber to said second chamber; and (c) a fluid contained in said chambers such that movement of the piston in either direction requires a portion of said fluid to pass through said channel from one chamber to the other.

3. The device of claim 2 wherein the channel is a bore through the piston.

4. The device of claim 2 wherein the channel is an annular gap between the piston and the body portion.

5. The device of claim 2 wherein the fluid is an essentially non-compressible liquid.

6. The device of claim 1 wherein the damping means comprises:

(a) said piston in said body portion effectively dividing said body portion into a first and a second chamber;

(b) a channel communicating said first chamber to said second chamber; and (c) a fluid contained in said chambers such that movement of the piston in either direction requires passage of a portion of said fluid through said channel from one chamber to the other.

7. The device of claim 1 wherein the cap seat and means for mounting are on an annular ring.

8. The device of claim 7 wherein the attachment of the body portion to the cap seat is achieved by a plurality of inwardly extending radial webs.

9. A device for relieving a positive pressure difference between the inside of a vessel and the outside of the vessel through an opening in said vessel, said device comprising:

(a) a base portion comprising:
(1) a means for mounting the device in the opening;
(2) a cap seat providing an orifice through which the positive pressure difference may be relieved and having a flange constituting its inner diameter;

(3) a generally hollow body portion attached to said cap seat and extending into the vessel coaxially with the cap seat;

(b) a cap portion comprising:
(1) a cap having a first surface external to said vessel and an opposing second surface, said first surface having a diameter larger than the diameter of said cap seat to retain said cap external to said cap seat in sealing relationship; said cap further comprising a flange around the periphery of the second surface, sized to be in concentric sliding engagement with the cap seat flange to prevent relief of pressure from within the vessel until the cap is lifted a sufficient amount to break the sliding engagement;

(2) a rod mounted concentrically and normal to said second surface at a first end thereof, the second end thereof extending into said body portion and terminating in a piston having a shoulder thereon, said piston being coaxially mounted and longitudinally movable within said body portion; and (b) a biasing means mounted in said body portion comprising:
(1) a compression spring coacting between an interior surface of said body portion and the shoulder of said piston to urge the cap into sealing relationship with said cap seat;

(2) a damping means acting within the body portion to resist movement of the cap portion relative to the base portion in either direction.

10. The device of claim 9 wherein the damping means comprises:

(a) said piston in said body portion effectively dividing said body portion into a first and a second chamber;

(b) a channel communicating said first chamber to said second chamber; and (c) a fluid contained in said chambers such that movement of the piston in either direction requires a portion of said fluid to pass through said channel from one chamber to the other.

11. The device of claim 10 wherein the channel is a bore through the piston.

12. The device of claim 10 wherein the channel is an annular gap between the piston and the body portion.

13. The device of claim 10 wherein the fluid is an essentially non-compressible liquid.

14. The device of claim 9 wherein the damping means comprises:

(a) said piston in said body portion effectively dividing said body portion into a first and a second chamber;

(b) a channel communicating said first chamber to said second chamber; and (c) a fluid contained in said chambers such that movement of the piston in either direction requires passage of a portion of said fluid through said channel from one chamber to the other.

15. The device of claim 9 wherein the cap seat and means for mounting are on an annular ring.

16. The device of claim 15 wherein the attachment of the body portion to the cap seat is achieved by a plurality of inwardly extending radial webs.

* * * * *